(12) United States Patent
Warren et al.

(10) Patent No.: US 11,560,971 B2
(45) Date of Patent: Jan. 24, 2023

(54) METHODS AND APPARATUS FOR USING CRIMP RINGS ON FLEXIBLE TUBING

(71) Applicants: Thomas L. Warren, West Hampton, MA (US); John Morin, Florence, MA (US)

(72) Inventors: Thomas L. Warren, West Hampton, MA (US); John Morin, Florence, MA (US)

(73) Assignee: John A. Morin, East Hampton, MA (US)

( * ) Notice: Subject to any disclaimer, the term of this patent is extended or adjusted under 35 U.S.C. 154(b) by 865 days.

(21) Appl. No.: 15/839,408

(22) Filed: Dec. 12, 2017

(65) Prior Publication Data

US 2018/0299040 A1 Oct. 18, 2018

Related U.S. Application Data

(60) Provisional application No. 62/485,755, filed on Apr. 14, 2017.

(51) Int. Cl.
*F16L 13/14* (2006.01)
*F16L 13/16* (2006.01)
*B21D 39/04* (2006.01)

(52) U.S. Cl.
CPC .......... *F16L 13/141* (2013.01); *B21D 39/048* (2013.01); *F16L 13/161* (2013.01)

(58) Field of Classification Search
CPC .... B21D 39/048; B21D 39/04; B21D 39/046; B21D 41/045; B21D 41/04; H01R 43/042; H01R 43/048; B25B 27/02; B25B 27/10; B25B 7/02; B25B 27/146; B29C 53/086; B29C 53/08; B29C 57/10; B23P 11/005

USPC ............................ 72/412; 81/9.3, 418–426.5
See application file for complete search history.

(56) References Cited

U.S. PATENT DOCUMENTS

| | | | |
|---|---|---|---|
| 810,241 A | | 1/1906 | Winkstrom |
| 3,085,313 A | * | 4/1963 | Macy .................. H01R 43/058 29/862 |
| 3,744,122 A | * | 7/1973 | Ridenour ............... B21D 39/04 29/516 |

(Continued)

OTHER PUBLICATIONS

Extended European Search Report for Application 18167359.1 dated Sep. 17, 2018.

*Primary Examiner* — Shelley M Self
*Assistant Examiner* — Teresa A Guthrie
(74) *Attorney, Agent, or Firm* — McCarter & English, LLP

(57) ABSTRACT

A crimping tool for crimping a metallic crimp ring. The crimping tool includes a first crimp die having a first curved contact surface and a second curved contact surface, the second curved contact surface spaced apart from the first curved contact surface, and a trench extending between the first curved contact surface and the second curved contact surface. The crimping tool also includes a second crimp die cooperatively engageable with the first crimp die having a first curved contact surface and a second curved contact surface, the second curved contact surface spaced apart from the first curved contact surface, and a trench extending between the first curved contact surface and the second curved contact surface. The trench of the first crimp die and the trench of the second crimp die forms an annular bead in a center portion of the metallic crimp ring.

11 Claims, 17 Drawing Sheets

(56) References Cited

U.S. PATENT DOCUMENTS

| | | | | |
|---|---|---|---|---|
| 5,353,623 A | * | 10/1994 | Bobenhausen | B21D 39/048 29/237 |
| 5,768,935 A | * | 6/1998 | Owens | B21D 39/048 29/237 |
| 6,584,821 B1 | | 7/2003 | Ghiran et al. | |
| 2017/0012398 A1 | * | 1/2017 | Dinh | H01R 43/058 |

* cited by examiner

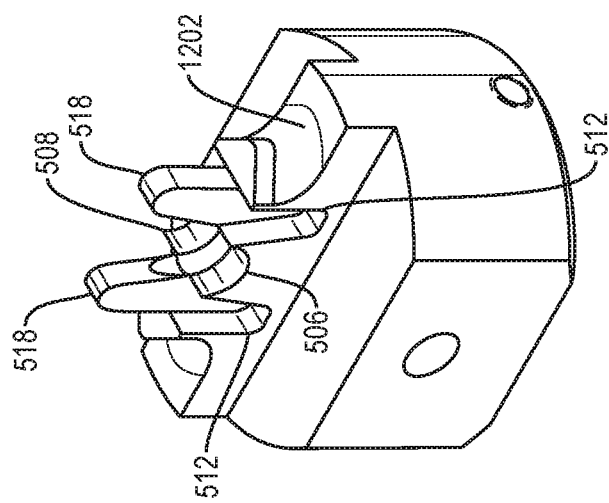
FIG. 12F
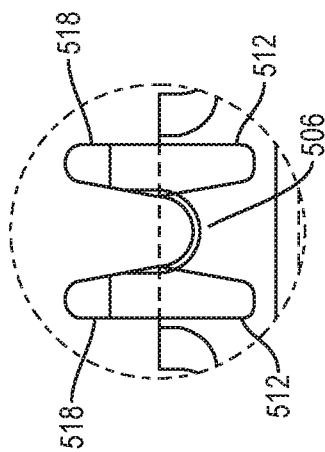
FIG. 12E
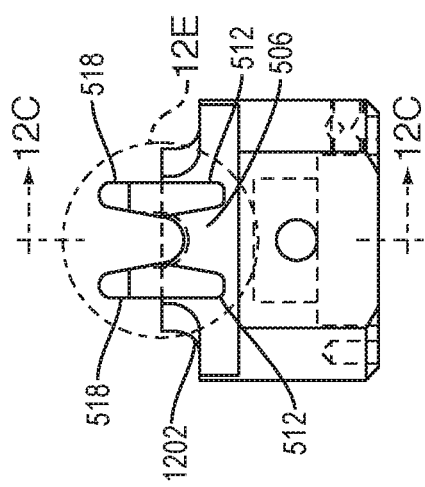
FIG. 12B
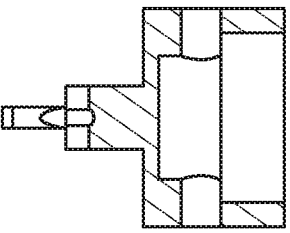
FIG. 12D
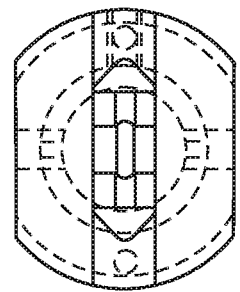
FIG. 12A
FIG. 12C

METHODS AND APPARATUS FOR USING CRIMP RINGS ON FLEXIBLE TUBING

RELATED APPLICATION

This application claims benefit of priority to U.S. Provisional Application No. 62/485,755 filed Apr. 14, 2017, the contents of which is hereby incorporated in its entirety.

BACKGROUND

In recent years polymeric pipes and tubes have displaced conventional steel pipe and copper tubing in a variety of services and applications. The polymeric pipes and tubes typically require crimp rings to hold the pipes or tubes onto fittings.

BRIEF DESCRIPTION OF THE DRAWINGS

To assist those of skill in the art in making and using a crimping tool for crimping a metallic crimp ring, reference is made to the accompanying figures. The accompanying figures, which are incorporated in and constitute a part of this specification, illustrate one or more embodiments of a crimp ring and crimp dies as taught herein. Illustrative embodiments are shown by way of example in the accompanying drawings and should not be considered as limiting. In the figures:

FIGS. 12A-12F illustrate an exemplary mount for the first crimp die as taught herein;

Figure 1:
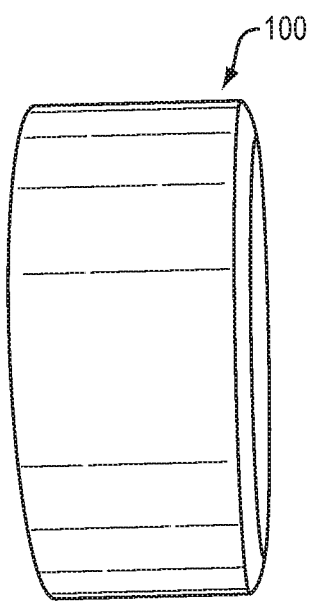
FIG. 1 illustrates a perspective view of an uncrimped crimp ring for connecting an end of a non-metallic flexible tube to a fitting.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE DISCLOSURE

Described in detail herein are systems, methods, and apparatuses for securing a non-metallic flexible tube to an inner hollow device, such as a fitting, using a crimp ring. At least one crimp die is used to crimp or compress the crimp ring onto an end of the non-metallic flexible tube and around the fitting, creating a positive mechanical lock and a liquid tight seal.

Figure 3:
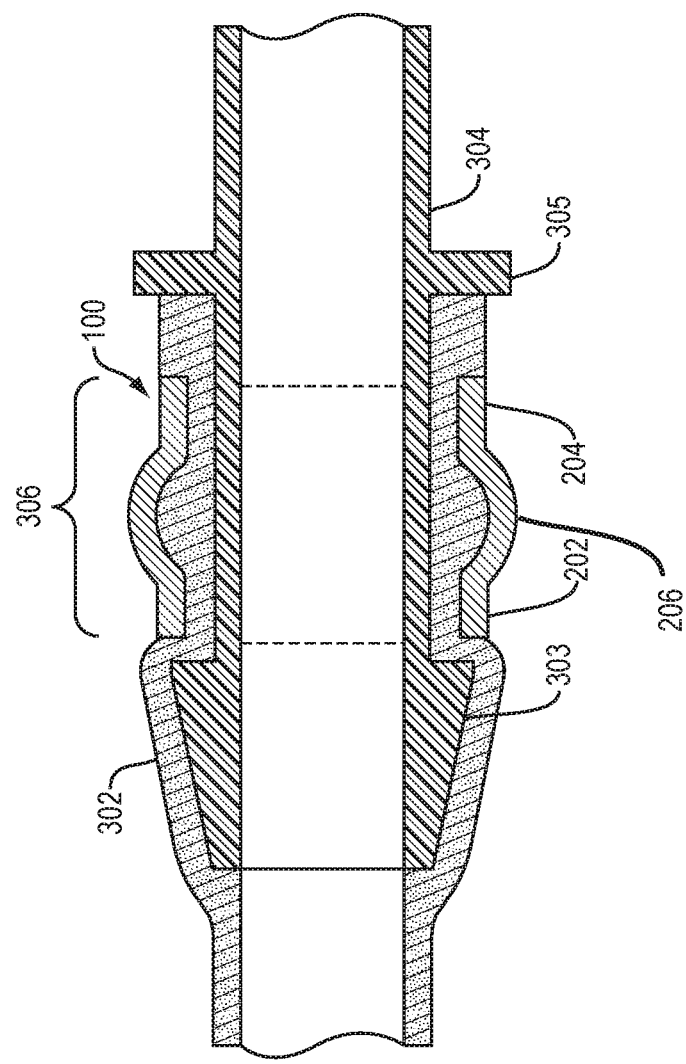
FIG. 3 is a schematic cross-sectional diagram of a non-metallic flexible tube connected to a nipple of a fitting by the crimp ring shown in FIGS. 2A and 2B.
Figure 4:
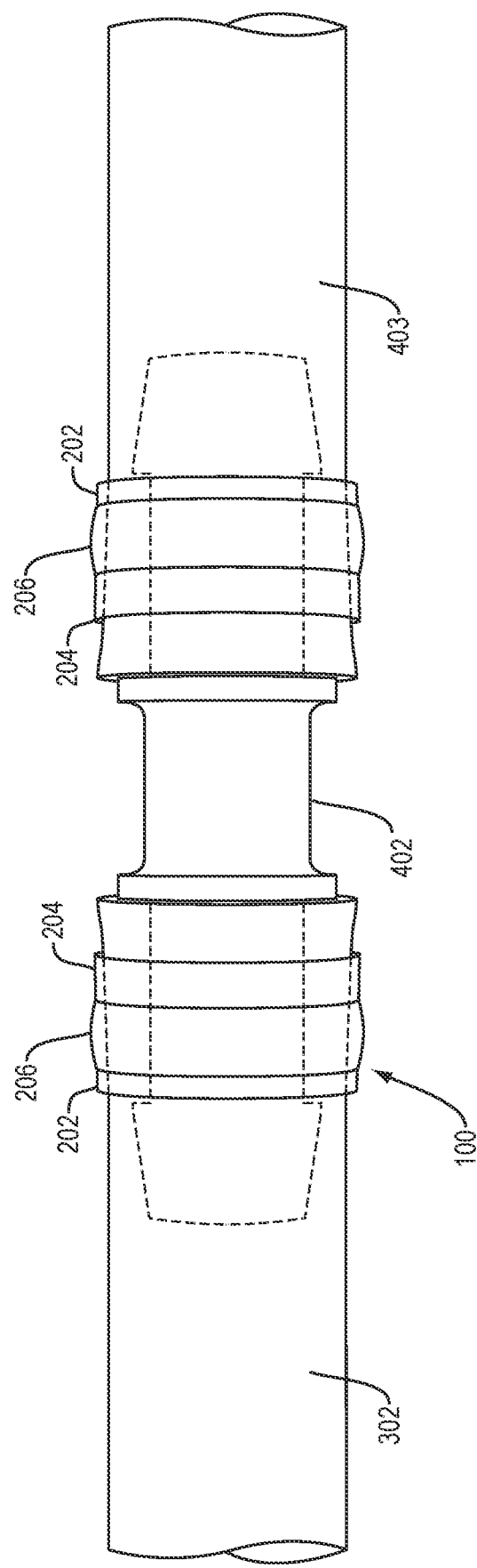
FIG. 4 illustrates a first non-metallic flexible tube connected to a second non-metallic flexible tube by a barbed connector using crimp rings shown in FIGS. 2A and 2B.

FIG. 1 illustrates a perspective view of an uncrimped crimp ring 100 for connecting an end of a non-metallic flexible tube to a fitting. In an exemplary embodiment, the crimp ring 100 comprises a circular 360 degree metallic body with a smooth exterior surface and an inner diameter slightly greater than an outer diameter of the non-metallic flexible tubing being connected to the fitting. An interior surface of the crimp ring 100 may have a smooth surface or a rough surface. The crimp ring 100 can receive an end of the non-metallic flexible tubing, which can be inserted into and through the crimp ring 100, as shown in FIGS. 3 and 4. In an exemplary embodiment, the crimp ring 100 is composed of stainless steel.

Figure 2A:
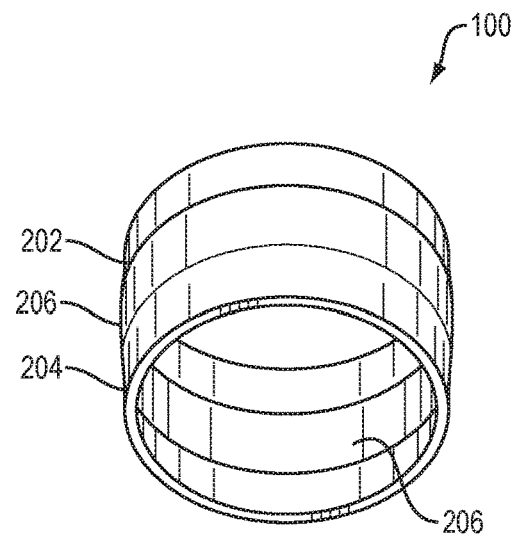
FIGS. 2A and 2B illustrate a top perspective view and a side perspective view, respectively, of the crimp ring shown in FIG. 1 in a crimped configuration.
Figure 2B:
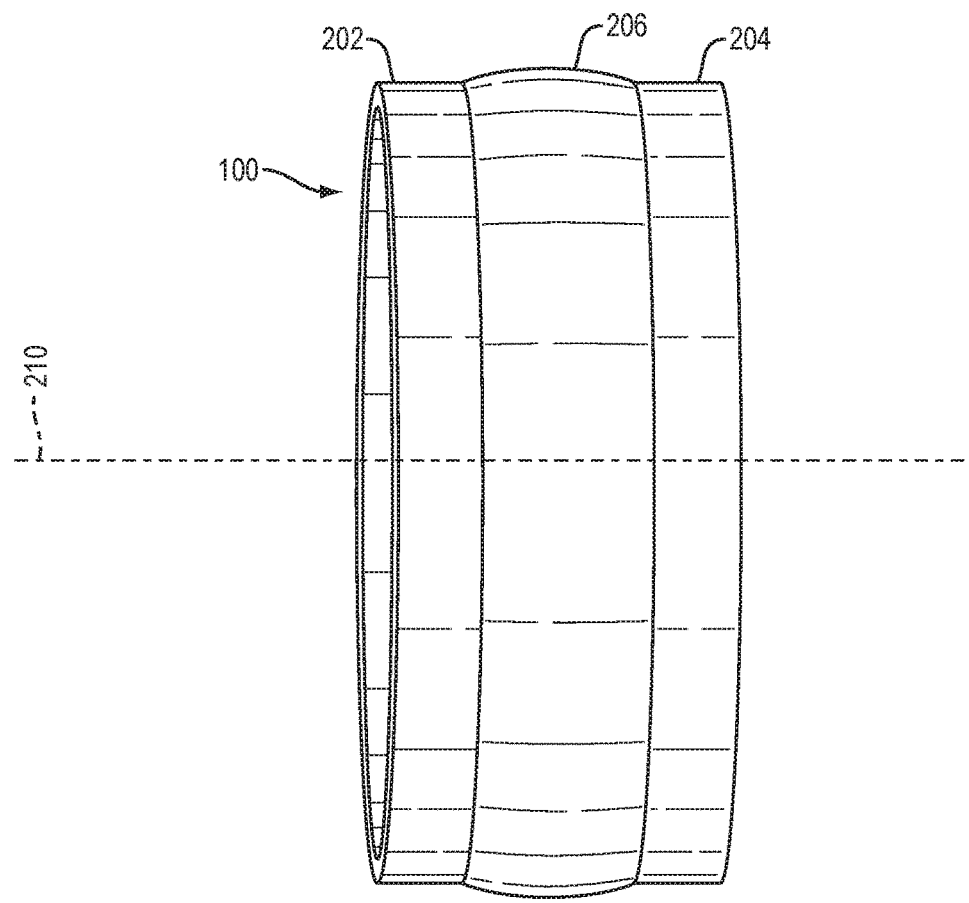

FIGS. 2A and 2B illustrate the crimp ring 100 shown in FIG. 1 in a crimped configuration. FIG. 2A illustrates a top perspective view of the crimp ring 100. FIG. 2B illustrates a side perspective view of the crimp ring 100. As illustrated, a first outer portion 202 and a second outer portion 204 of the metallic body are crimped. As used herein, crimping the first outer portion 202 and the second outer portion 204 involves similarly compressing the first and second outer portions 202 and 204 of the crimp ring 100. In an exemplary embodiment, the first outer portion 202 and the second outer portion 204 are crimped onto a non-metallic flexible tube, as shown in FIGS. 3 and 4, using a crimp die set having a first crimp die and a second crimp die as taught and illustrated herein. Crimping the first outer portion 202 and the second outer portion 204 of the crimp ring 100 annularly compresses the non-metallic flexible tube. For example, as shown in FIG. 3, the non-metallic flexible tube may be compressed radially inward onto a fitting. During the compression, an inner and an outer diameter of the first outer portion 202 and an inner and an outer diameter of the second outer portion 204 are reduced as the first outer portion 202 and the second outer portion 204 are urged into the non-metallic flexible tube to secure the first and/or second outer portions 202 and 204.

During the annular compression of the outer portions of the crimp ring 100, embodiments of the crimp die set descried herein control a final shape of the crimp ring 100 for strength and appearance purposes. As explained further below, crimping the first outer portion 202 and the second outer portion 204 of the crimp ring 100 creates an annular bead 206 in a center portion of the crimp ring 100. As the first outer portion 202 and the second outer portion 204 of the crimp ring 100 are annularly compressed, the material being compressed requires a place to go and is forced into the center portion, creating the annular bead 206. In one embodiment, each of the outer portions 202, 204 accounts for 25% of a width of the crimp ring 100 (measured along a center axis 210 of the crimp ring 100) and the annular bead 206 in the center portion accounts for 50% of the width of the crimp ring 100. In alternative embodiments, the outer portions 202, 204 account for a greater or a lesser percentage of the width of the crimp ring 100 (e.g., approximately 10-25% or approximately 25-40%). Likewise, in alternative embodiments, the annular bead 206 accounts for a greater or a lesser percentage of the width of the crimp ring 100 (e.g., approximately 20-80%).

An inner and an outer diameter of the annular bead 206 is greater than the inner and the outer diameter of the outer portions 202, 204. The inner and the outer diameter gradually increases from the first outer portion 202 to a midway point of the annular bead 206 and decreases from the midway point of the annular bead 206 to the second outer portion 204, such that the annular bead 206 has a curved or arcuate profile.

The annular bead 206 provides pressure relief for the non-metallic flexible tube in areas where the crimp ring 100 is compressing the non-metallic flexible tube. The pressure relief lessens and/or prevents deforming or stretching of the non-metallic flexible tube potentially caused by the compression of the crimp ring 100. The annular bead 206 further prevents the crimp ring 100 from being deformed as the first outer portion 202 and the second outer portion 204 are compressed. In an exemplary embodiment, the non-metallic flexible tube is silicone tubing.

In an exemplary embodiment and as illustrated in FIGS. 2A-2B, the crimp ring 100 has a smooth exterior surface to reduce a chance of cutting into or through sealed sterile bags transporting tubing and/or devices that includes one or more crimp rings 100. If a sterile bag were punctured during transportation, it would become non-sterile and possibly unusable by an end user. Non-limiting examples of crimping devices that may puncture sealed bags are zip ties and barb locks that have sharp edges and raised surfaces. This type of packaging is commonly used within the medical industry for transportation between facilities and for transferring devices into and out of clean room environments.

FIG. 3 is a cross-sectional schematic diagram of a non-metallic flexible tube 302 connected to a barbed nipple 303 of a connector fitting 304 by the crimp ring 100 shown in FIG. 1. In an exemplary embodiment, the non-metallic flexible tube 302 is platinum cured silicone tubing. An end portion of the non-metallic flexible tube 302 is compressed onto the fitting 304 using the crimp ring 100. The fitting 304 can be made of either metal or plastic or a composition of both and may include at least one barbed section, such as the barbed nipple 303, for frictional engagement with the flexible tube 302. In an exemplary embodiment, the flexible tubing 302 has a hardness Durometer Rating of 50 A-80 A.

In some embodiments, connection of the non-metallic flexible tube 302 to the fitting 304 can be achieved by urging an uncrimped crimp ring 100 onto an end of the flexible tube 302 such that the flexible tube is received and passes through the uncrimped crimp ring 100. Subsequently, the fitting 304 can be inserted into the end of the flexible tube 302 such that the fitting 304 is received by the flexible tube 302. Once the fitting 304 is seated (inserted and engaged with flexible tube 302), the crimp ring 100 is positioned around a portion of the flexible tube 302, for example, between the barbed nipple 303 of the fitting 304 and a flange 305 of the fitting 304 acting as a stop for the flexible tube 302, into which the fitting 304 has been inserted. The crimp ring 100 is then crimped by the crimp die set as taught herein to compress the non-metallic flexible tube 302 onto the fitting 304, as shown at 306. The flexible tube 302 is compressed between the crimp ring 100 and the fitting 304 by the compressed first and second outer portions 202, 204, which creates a stop with the barbed nipple 303. The annular bead 206 provides an uncompressed area that relives stress on the flexible tube 302.

FIG. 4 illustrates a first non-metallic flexible tube 302 connected to a connector fitting 402 using the crimp ring 100 shown in FIG. 1. In some embodiments, the connector fitting 402 is the same as connector fitting 304. Opposite to the first non-metallic flexible tube 302 connected to the fitting 402 is a second non-metallic flexible tube 403 attached to the connector fitting 402 by the crimp ring 100 shown in FIG. 1. In an exemplary embodiment, the fitting 402 is composed of plastic, as would be used, for example, in a hose connection to a medical device. Each crimp ring 100 is composed of a malleable ferrous or non-ferrous metal (e.g., copper, brass, steel, etc.).

Each crimp ring 100 includes the first outer portion 202 and the second outer portion 204 that are crimped. In an exemplary embodiment, the first outer portion 202 and the second outer portion 204 of each crimp ring are crimped onto the non-metallic flexible tube 302, 403. The first outer portion 202 and the second outer portion 204 annularly compress the non-metallic flexible tube 302, 403 onto the fitting 402. Crimping the first outer portion 202 and the second outer portion 204 creates the annular bead 206 in a center portion of each crimp ring 100.

Figure 5B:
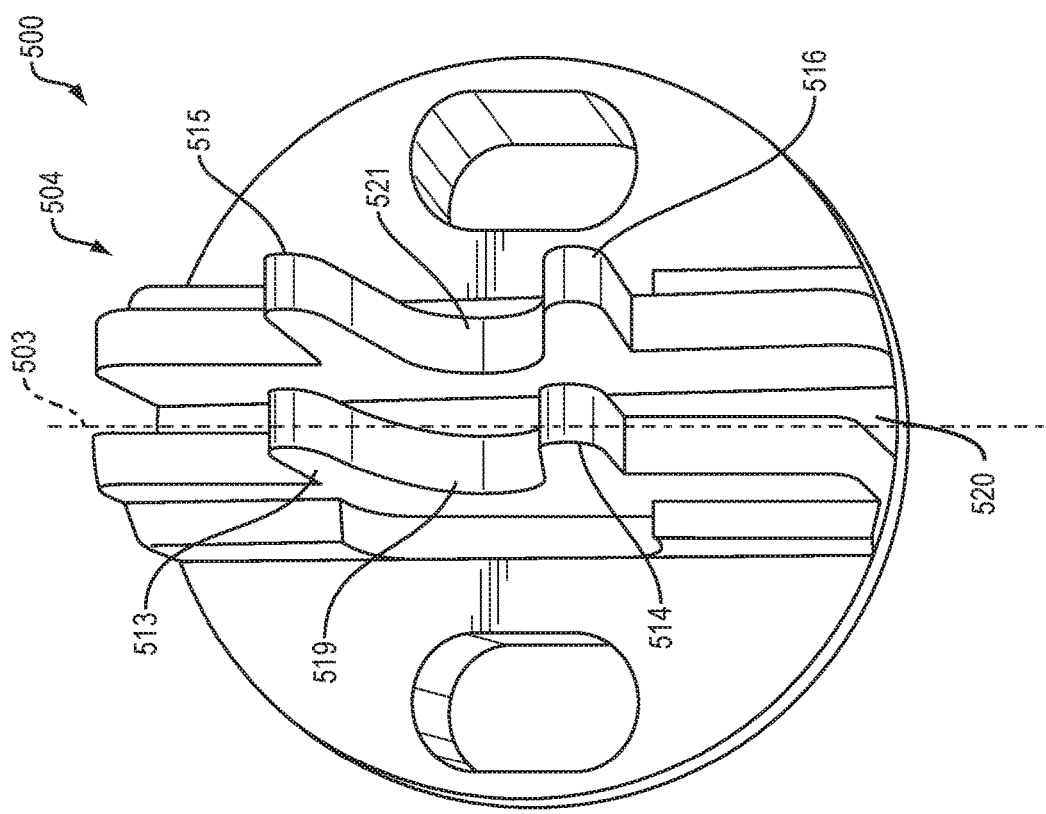
FIGS. 5A and 5B illustrate a top perspective view of a first crimp die and a second crimp die, respectively, for crimping the crimp ring shown in FIG. 1.
Figure 5A:
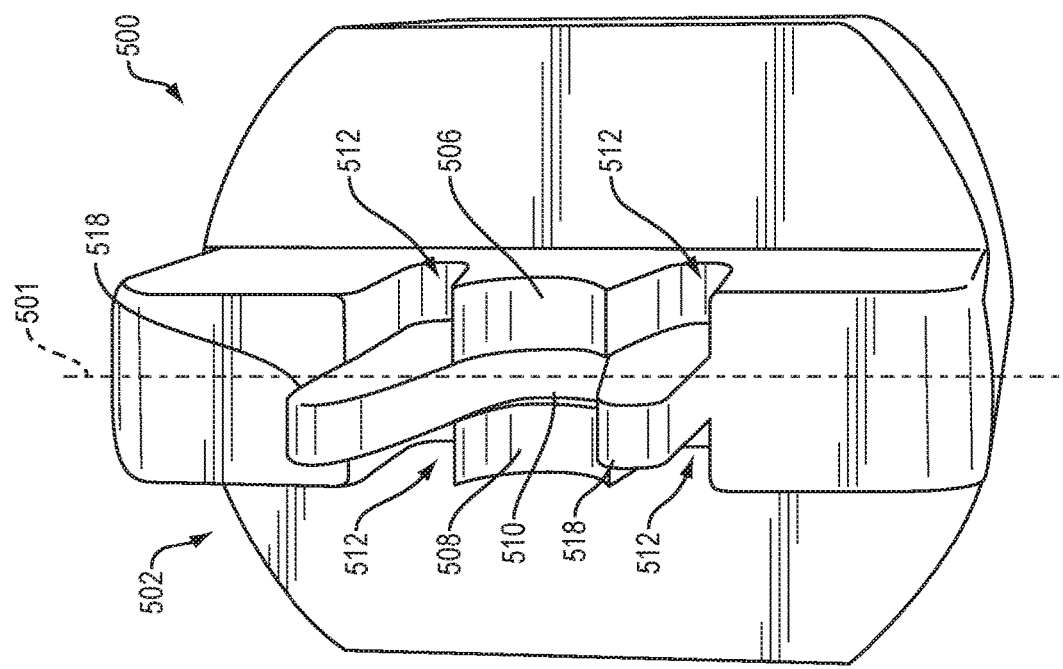

FIGS. 5A-5B illustrate a top perspective view of a crimp die set 500 as taught herein. The crimp die set 500 was used to crimp the crimp rings 100 illustrated in FIGS. 2-4. The crimp die set 500 includes a first crimp die 502 shown in FIG. 5A and a related embodiment in FIGS. 12A-12F, and a second crimp die 504 shown in FIG. 5B and a related embodiment in FIGS. 13A-13F. FIGS. 5A-5B illustrate a crimp die set 500 configured for crimping onto a straight fittings, while FIGS. 12A-12F and FIGS. 13A-13F illustrate the crimp die set 500 that includes relief cuts into the first crimp die 502 and the second crimp die 504 to allow for crimping onto a "Y-fitting."

The first crimp die 502 includes a first curved contact surface 506 and a second curved contact surface 508 that extend parallel to one another along, and on opposite sides of a center axis 501. The first curved contact surface 506 is spaced apart from the second curved contact surface 508 by a radial trench 510 aligned with the center axis 501. The first curved contact surface 506 and the second curved contact surface 508 are spaced apart a sufficient distance for contacting a first outer portion 202 and a second outer portion 204 of the crimp ring 100. The first curved contact surface 506 and the second curved contact surface 508 each form a semi-circle. In some embodiments, the first curved contact surface 506 and the second curved contact surface 508 extends circumferentially 180 degrees from a first end to a second end of the curved contact surface to form a generally concave surface.

In some embodiments, the first crimp die 502 includes slots 512 located on adjacent sides of the first curved contact surface 506 and the second curved contact surface 508 along the center axis 501. The slots 512 are configured to receive respective guide fingers 513, 514, 515, and 516 of the second crimp die 504, as described below with respect to FIG. 5B and FIGS. 13A-13F. In one embodiment, the slots 512 and the fingers 513, 514, 515, and 516 are approximately the same width.

The first crimp die 502 further includes guide fingers 518 located between the first curved contact surface 506 and the second curved contact surface 508 of the first crimp die 502 and further define the geometry of the radial trench 510 aligned with the central axis 501. The guide fingers 518 inserts into a trench 520 positioned along a center axis 503 in the second crimp die 504 shown in FIG. 5B when the die set 500 is engaged. In one embodiment, a width of the guide fingers 518 and the trench 520, measured perpendicularly relative to the center axes 501 and 503, respectively, is 25% to 75% of a width of the crimp ring 100. In alternative embodiments, the width of the guide fingers 518 and the trench 520 are a greater or a lesser percentage of the width of the crimp ring 100. As illustrated, the guide fingers 518 extend outwardly past the height of the first curved contact surface 506 and the second curved contact surface 508. In an exemplary embodiment, the guide fingers 518 are tapered with smooth edges.

The second crimp die 504 is cooperatively engageable with the first crimp die 502. The second crimp die 504 includes a first curved contact surface 519 and a second curved contact surface 521 that are spaced apart and extend parallel to one another along the center axis 503. A trench 520 extends on the center axis 503 between the first curved contact surface 519 and the second curved contact surface 521. In some embodiments, the trench 520 is a radial trench, like the radial trench 510. In additional embodiments, the trench 520 is a slot. The first curved contact surface 519 and the second curved contact surface 521 are spaced apart at a sufficient distance for contacting with the first outer portion 202 and the second outer portion 204 of the crimp ring 100.

In an exemplary embodiment, the first curved contact surface 519 and the second curved contact surface 521 each form semi-circles. In some embodiments, the first curved contact surface 519 and the second curved contact surface 521 extends circumferentially 180 degrees from a first end to a second end of the curved contact surface such that the first and second curved contact surfaces 519 and 521 have a generally concave surface. The second crimp die 504 further includes the guide fingers 513 and 514 that extend outwardly from the first curved contact surface 519 and includes the guide fingers 515 and 516 that extend outwardly from the second curved contact surface 521. As illustrated, the guide fingers 513, 514, 515, and 516 are tapered with smooth edges.

The curved contact surfaces 506, 508 of the first crimp die 502 are spaced at a specified distance that corresponds to a width of the crimp ring 100, such that a distance between an outer edge of each of the contact surfaces is equal to or greater than the width of the crimp ring 100. Likewise, the curved contact surfaces 519, 521 of the second crimp die 504 are spaced at a specified distance that corresponds to a width of the crimp ring 100, such that a distance between an outer edge of each of the contact surfaces is equal to or greater than the width of the crimp ring 100.

In some embodiments, the first curved contact surface 506 and the second curved contact surface 508 of the first crimp die 502 are spaced apart a substantially same distance as the first curved contact surface 519 and the second curved contact surface 521 of the second crimp die 504 such that when the first and second die 502 and 504 are engaged, the first curved contact surface 506 aligns with the first curved contact surface 519 and the second curved contact surface 508 aligns with the second curved contact surface 521 to form generally circular openings. When the first and second die 502 and 504 are engaged about an embodiment of the crimp ring 100, the first curved contact surfaces 506 and 519 can form the first outer portion of the compressed crimp ring and the second curved contact surfaces 508 and 521 can form the second outer portion of the compressed crimp ring. The space between the paired curved contact surfaces (e.g., defined by the radial trench 501 and radial trench 520) forms an annular bead 206 along a center portion of the crimp ring 100. The annular bead 206 has substantially a same width as the space between the paired curved contact surfaces.

In other embodiments, the first curved contact surface 506 and the second curved contact surface 508 of the first crimp die 502 are spaced apart at a different distance than the first curved contact surface 519 and the second curved contact surface 521 of the second crimp die 504 such that when the first and second die 502 and 504 are engaged, the first curved contact surface 506 is offset relative to the first curved contact surface 519 and the second curved contact surface 508 is offset relative to the second curved contact surface 521. When the first and second die 502 and 504 are engaged about an embodiment of the crimp ring 100, the first curved contact surfaces 506 and 519 can form the first outer portion of the compressed crimp ring and the second curved contact surfaces 508 and 521 can form the second outer portion of the crimped crimp ring. The offset between the first curved contact surfaces 506 and 519, the offset between the second curved contact surfaces 508 and 521, and the space between the paired curved contact surfaces (e.g., defined by the radial trench 501 and radial trench 520) form an annular bead 206 along a center portion of the crimp ring 100.

In an exemplary embodiment, the first crimp die 502 is positioned opposite to the second crimp die 504 and the crimp ring 100 placed between the crimp dies 502, 504. The crimp dies 502, 504 are configured to engage with each other to crimp the crimp ring 100. More specifically, the first curved contact surface 506 and the second curved contact surface 508 of the first crimp die 502 contact and compress a section of the first outer portion 202 and a section of the second outer portion 204 of the crimp ring 100, respectively. Likewise, the first curved contact surface 519 and the second curved contact surface 521 of the second crimp die 504 contact and compress a section of the first outer portion 202 and a section of the second outer portion 204 of the crimp ring 100, respectively. In an exemplary embodiment, the first crimp die 502 annularly compresses a first half of the crimp ring 100 and the second crimp die 504 annularly compresses a second half of the crimp ring 100, such that when the crimp ring is compressed around the assembled flexible tube and the fitting, the compressed crimp ring forms a positive mechanical lock and/or a liquid tight seal. The compression causes excess material of crimp ring 100 to be pushed into the trenches 510, 520, creating the annular bead 206 shown in FIGS. 2-4.

Figure 6B:
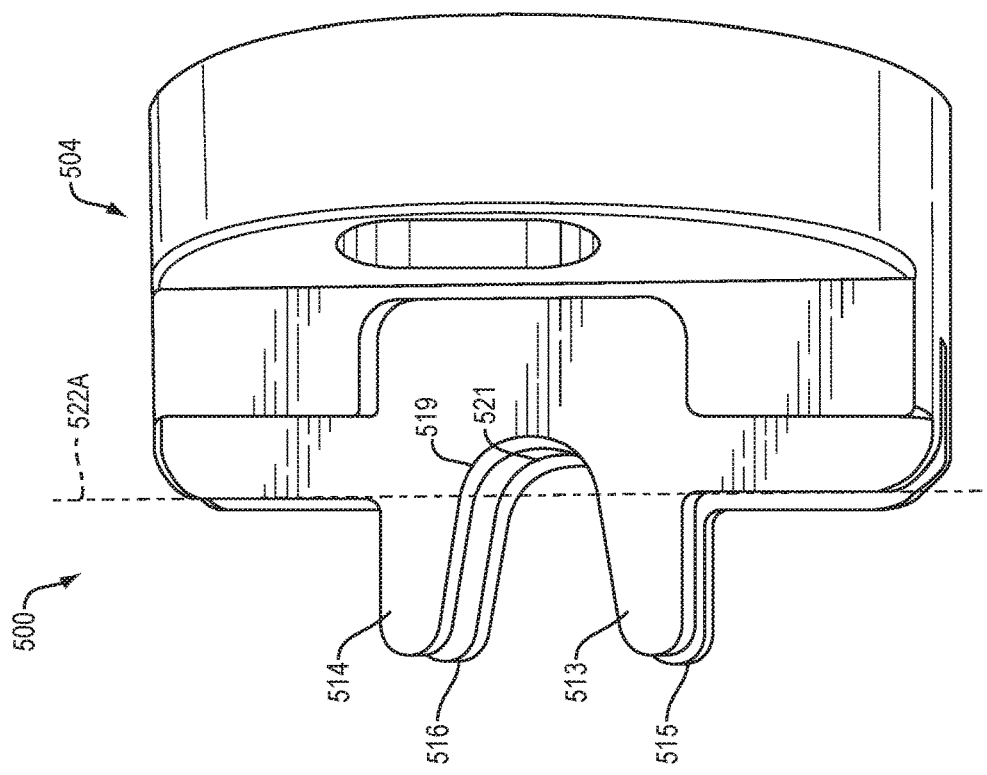
FIGS. 6A and 6B illustrate a side perspective view of the first crimp die and the second crimp die shown in FIGS. 5A and 5B, respectively.
Figure 6A:
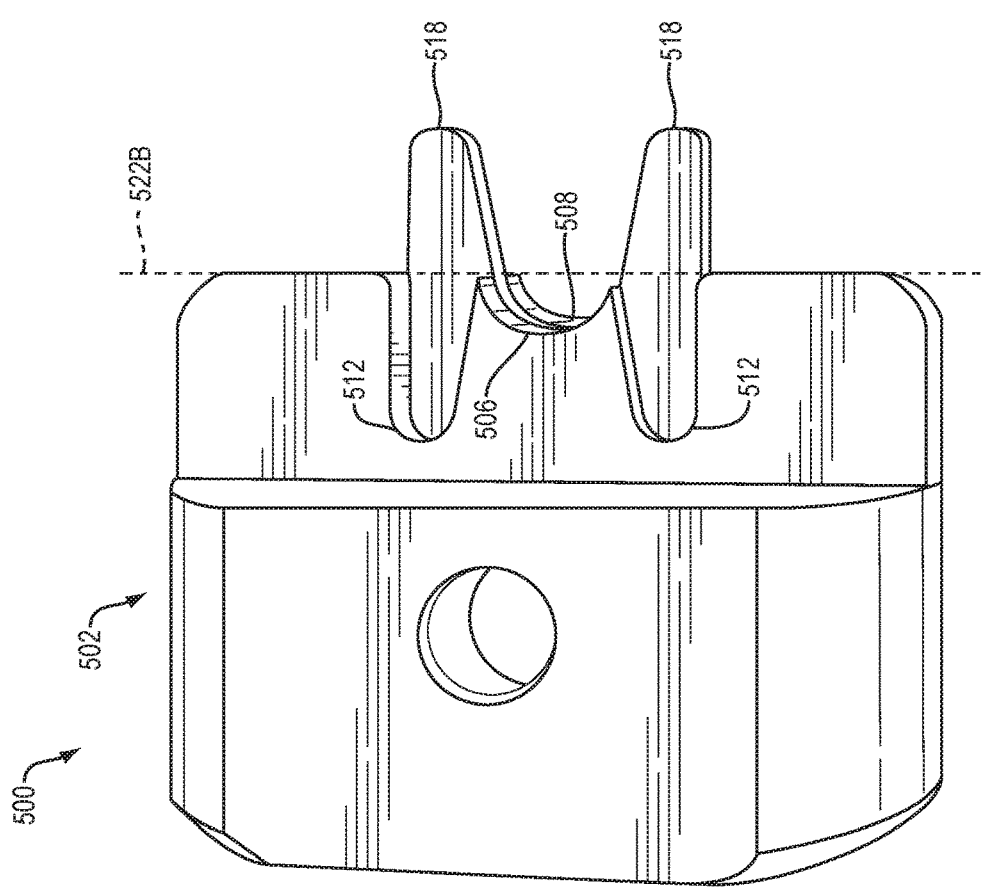

FIGS. 6A and 6B illustrate a side perspective view of the crimp die set 500 shown in FIGS. 5A and 5B, including the first crimp die 502 shown in FIG. 6A and the second crimp die 504 shown in FIG. 6B. The first crimp die 502 and the second crimp die 504 are positioned opposite each other for engaging. Upon engaging, the guide fingers 513, 514, 515, 516 of the second crimp die 504 are configured to insert into the slots 512 of the first crimp die 502. For illustration purposes, a line 522A is shown that marks the terminal ends of the first curved contact surface 519 and the second curved contact surface 521 and the beginning of the guide fingers 513, 514, 515, and 516. Likewise, a line 522B is shown that marks the terminal ends of the first curved contact surface 506 and the second curved contact surface 508 and the beginning of the guide fingers 518. However, in alternative embodiments, the lines 522A, 522B could be located in different positions.

The guide fingers 518 of the first crimp die 502 are configured to insert into the trench 520 of the second crimp die 504, adjacent to the first curved contact surface 519 and the second curved contact surface 521.

The first outer portion 202 and the second outer portion 204 of the crimp ring 100 are compressed by the curved contact surfaces 506, 508, 519, and 521, creating the annular bead 206 in a center portion of the crimp ring 100 that protrudes into trenches 510, 520.

Figure 7:
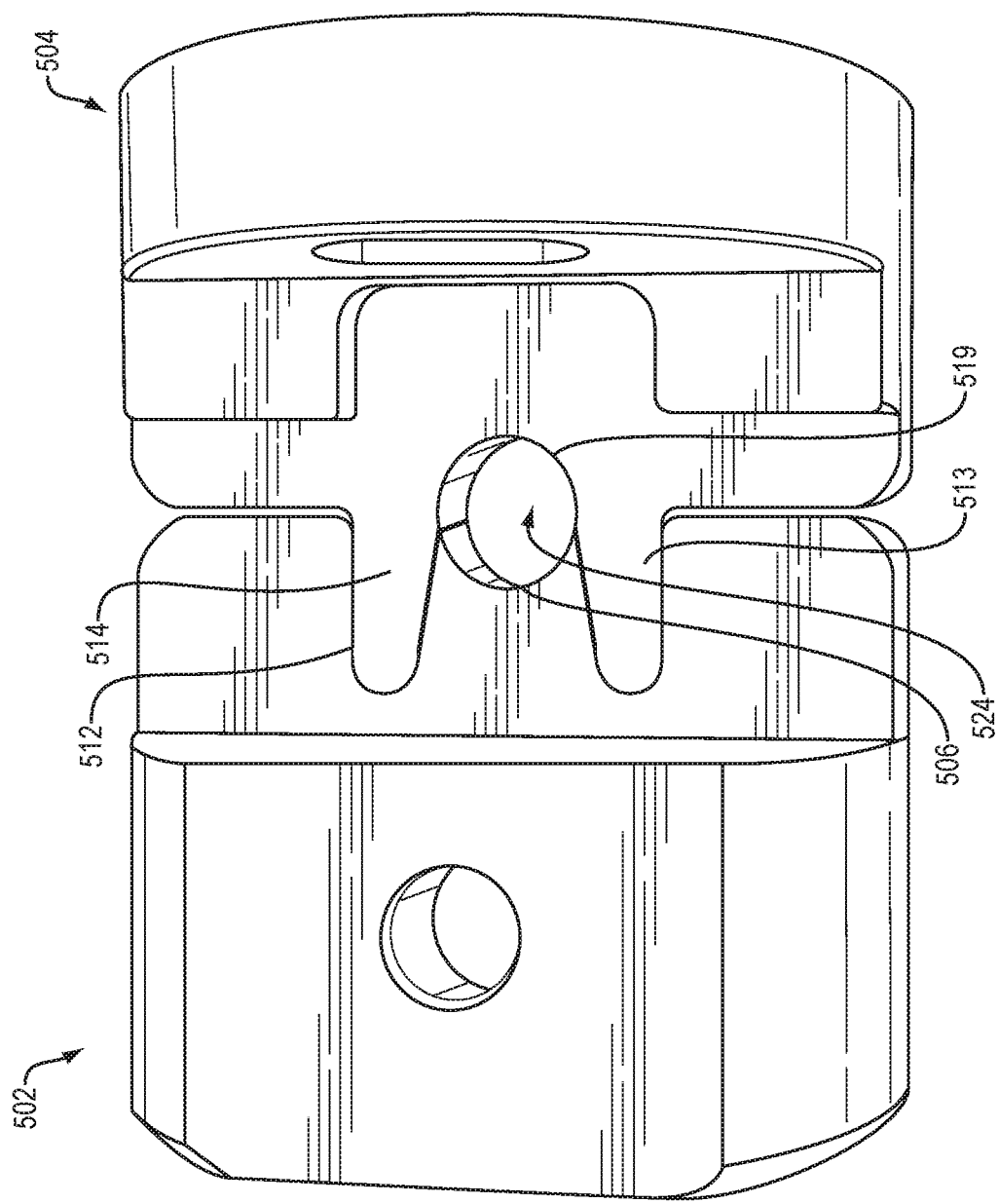
FIG. 7 illustrates a side perspective view of the first crimp die mated with the second crimp die shown in FIGS. 5A and 5B.

FIG. 7 illustrates the cooperative engagement of the first crimp die 502 and the second crimp die 504 shown in FIGS. 5A and 5B. The guide fingers 513, 514, 515, and 516 of the second crimp die 504 are inserted into the slots 512 of the first crimp die 502. The guide fingers 518 of the first crimp die 502 are inserted into the trench 520 of the second crimp die 504 in between the guide fingers 513, 514, 515, and 516.

The cooperative engagement of the first crimp die 502 and the second crimp die 504 creates a circular contact area 524 where the first outer portion 202 and the second outer portion 204 of the crimp ring 100 are compressed. A circular contact area exists on both sides of the engaged first crimp die 502 and the second crimp die 504.

Figure 8B:
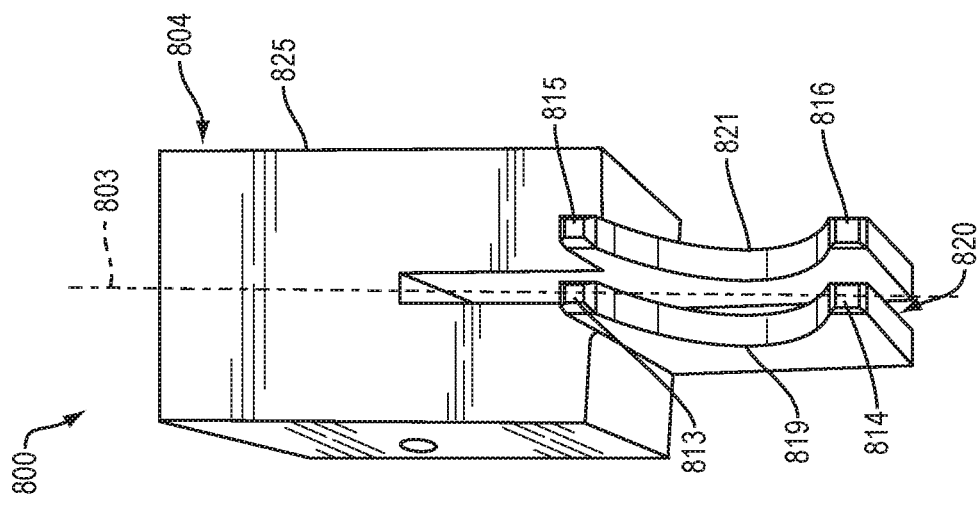
FIGS. 8A-8F illustrate additional embodiments of the first crimp die and the second crimp die as taught herein.
Figure 8A:
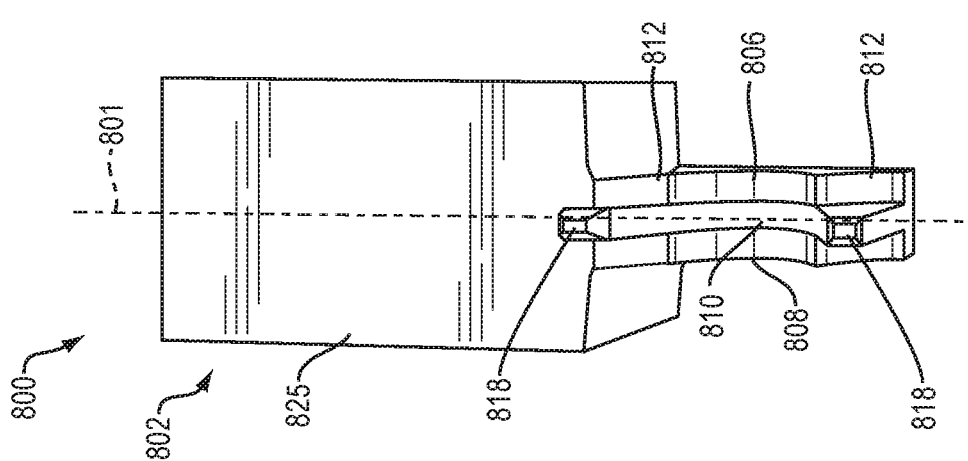
Figure 8D:
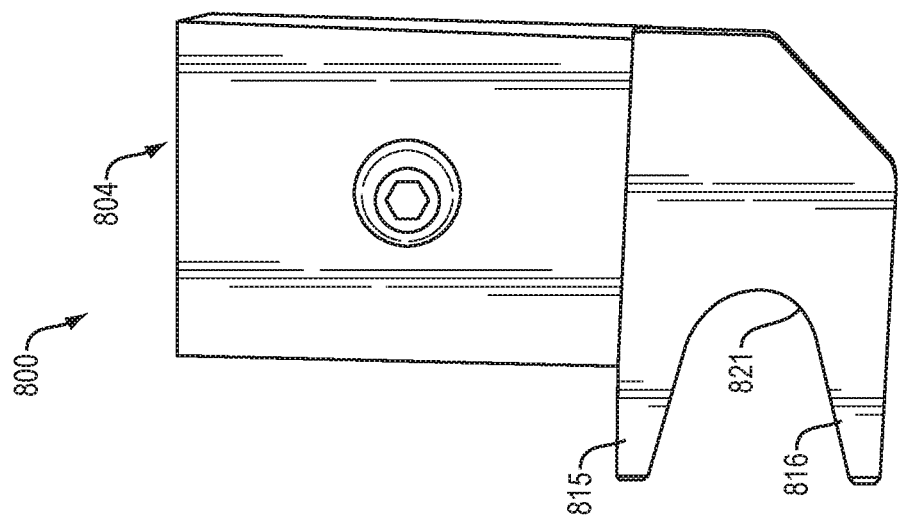
Figure 8C:
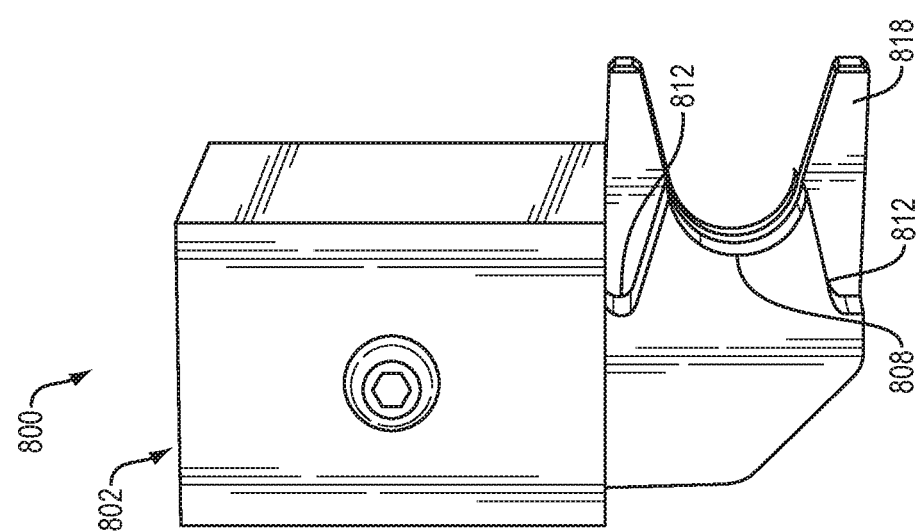
Figure 8E:
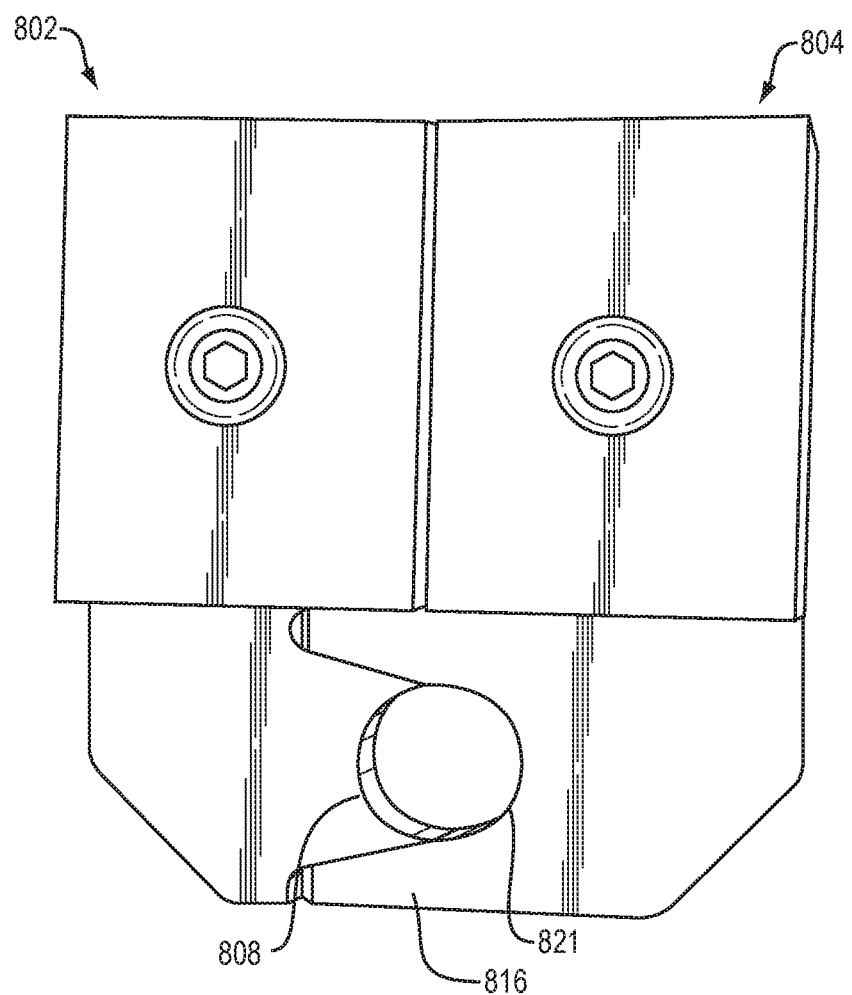
Figure 8F:
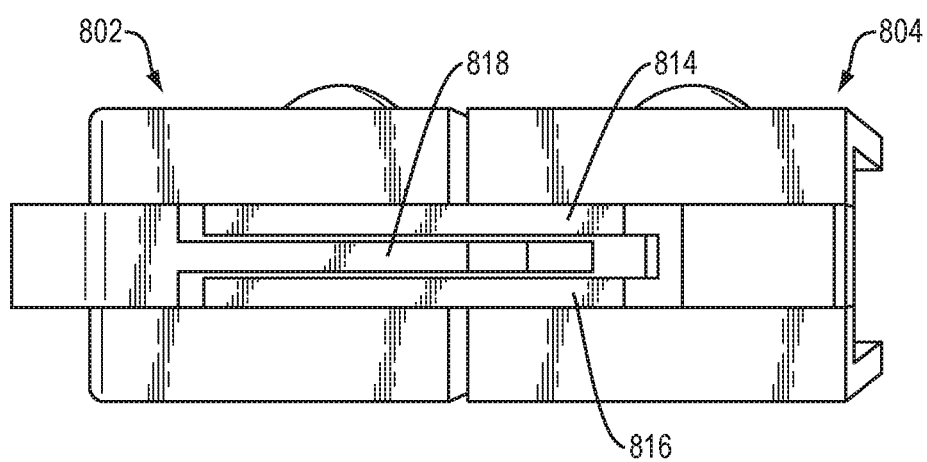

FIGS. 8A-8F illustrates additional embodiments of a crimp die set 800 as taught herein. The crimp die set 800 includes a first crimp die 802 and a second crimp die 804. FIGS. 8A and 8B illustrate a top perspective view of the crimp die set 800. FIGS. 8C and 8D illustrate a side perspective view of the crimp die set 800. FIG. 8E illustrates a side perspective view of the first crimp die 802 mated with the second crimp die 804. FIG. 8F illustrates a top perspective view of the first crimp die 802 mated with the second crimp die 804.

The first crimp die 802 and a second crimp die 804 are mounted to mounting blocks 825 having a polygon shape. The first crimp die 802 and a second crimp die 804 can be mounted to any size mounting block. The first crimp die 802 includes a first curved contact surface 806 and a second curved contact surface 808 that extend parallel to one another along a center axis 801. The first curved contact surface 806 is spaced apart from the second curved contact surface 808 by a radial trench 810 aligned with the center axis 801. The first curved contact surface 806 and the second curved contact surface 808 are spaced apart a sufficient distance for contacting a first outer portion and a second outer portion of a crimp ring.

In some embodiments, the first crimp die 802 includes slots 812 located on adjacent sides of the first curved contact surface 806 and the second curved contact surface 808 along the center axis 801. The slots 812 are configured to receive guide fingers 813, 814, 815, and 816 of the second crimp die 804.

The first crimp die 802 further includes guide fingers 818 located between the first curved contact surface 806 and the second curved contact surface 808 of the first crimp die 802. The guide fingers 818 further define the geometry of the radial trench 810 aligned with the central axis 801. The guide fingers 818 insert into a trench 820 positioned along a center axis 503 in the second crimp die 804 when the die set 800 is engaged. As illustrated, the guide fingers 818 extend outwardly past the height of the first curved contact surface 806 and the second curved contact surface 808. In an exemplary embodiment, the guide fingers 818 are tapered with smooth edges.

The second crimp die 804 is cooperatively engageable with the first crimp die 802. The second crimp die 804 includes a first curved contact surface 819 and a second curved contact surface 821 that are spaced apart and extend parallel to one another along a center axis 803. The radial trench 820 extends between the first curved contact surface 819 and the second curved contact surface 821. The first curved contact surface 819 and the second curved contact surface 821 are spaced apart at a sufficient distance for contacting with the first outer portion and the second outer portion of the crimp ring. In an exemplary embodiment, the guide fingers 813, 814, 815, and 816 of the second crimp die 804 are tapered with smooth edges.

In some embodiments, the first curved contact surface 806 and the second curved contact surface 808 of the first crimp die 802 are spaced apart a substantially same distance as the first curved contact surface 819 and the second curved contact surface 821 of the second crimp die 804 such that when the first and second die 802 and 804 are engaged, the first curved contact surface 806 aligns with the first curved contact surface 819 and the second curved contact surface 808 aligns with the second curved contact surface 821 to form generally circular openings. When the first and second die 802 and 804 are engaged about an embodiment of the crimp ring 100, the first curved contact surfaces 806 and 819 can form the first outer portion of the compressed crimp ring and the second curved contact surfaces 808 and 821 can form the second outer portion of the compressed crimp ring. The space between the paired curved contact surfaces (e.g., defined by the radial trench 801 and radial trench 820) forms an annular bead (e.g., annular bead 206) along a center portion of the crimp ring 100. The annular bead has substantially a same width as the space between the paired curved contact surfaces.

In other embodiments, the first curved contact surface 806 and the second curved contact surface 808 of the first crimp die 802 are spaced apart at a different distance than the first curved contact surface 819 and the second curved contact surface 821 of the second crimp die 804 such that when the first and second die 802 and 804 are engaged, the first curved contact surface 804 is offset relative to the first curved contact surface 819 and the second curved contact surface 808 is offset relative to the second curved contact surface 821. When the first and second die 802 and 804 are engaged about an embodiment of the crimp ring 100, the first curved contact surfaces 806 and 819 can form the first outer portion of the compressed crimp ring and the second curved contact surfaces 808 and 821 can form the second outer portion of the compressed crimp ring. The offset between the first curved contact surfaces 804 and 819, the offset between the second curved contact surfaces 808 and 821, and the space between the paired curved contact surfaces (e.g., defined by the radial trench 801 and radial trench 820) form an annular bead along a center portion of the crimp ring 100.

In an exemplary embodiment, the first crimp die 802 is positionable opposite to the second crimp die 804 and the crimp ring 100 is placed between the crimp die 802 and the crimp die 804. The crimp dies 802 and 804 are configured to cooperatively engage with each other to crimp the crimp ring 100 to the flexible tubing. More specifically, the first curved contact surface 806 and the second curved contact surface 808 of the first crimp die 802 contact and compress a section of the first outer portion 202 and a section of the second outer portion 204 of the crimp ring 100. Likewise, the first curved contact surface 819 and the second curved contact surface 821 of the second crimp die 804 contact and compress a section of the first outer portion 202 and a section of the second outer portion 204 of the crimp ring 100. In an exemplary embodiment, the first crimp die 802 annularly compresses a first circumferential half of the first and second outer portions crimp ring 100 and the second crimp die 804 annularly compresses a second circumferential half of the first and second outer portions of the crimp ring 100 to form a positive mechanical lock. The compression causes excess material of crimp ring 100 to be pushed into the radial trenches 810 and 820, creating the annular bead 206 in a center portion of the crimp ring 100.

One suitable material for use in forming the crimp dies taught herein is type 420 stainless steel. In one embodiment, the crimp dies are hardened to 50-52 RHc. In alternative embodiments, the crimp dies have a higher or a lower hardness rating. In some embodiments, the radial trench should be 25 to 75% in width of the crimp rings width being used. Lead-in and interlocking die angular dimensions are gradual and may range from 1 degree to 45 degrees in size.

Figure 9:
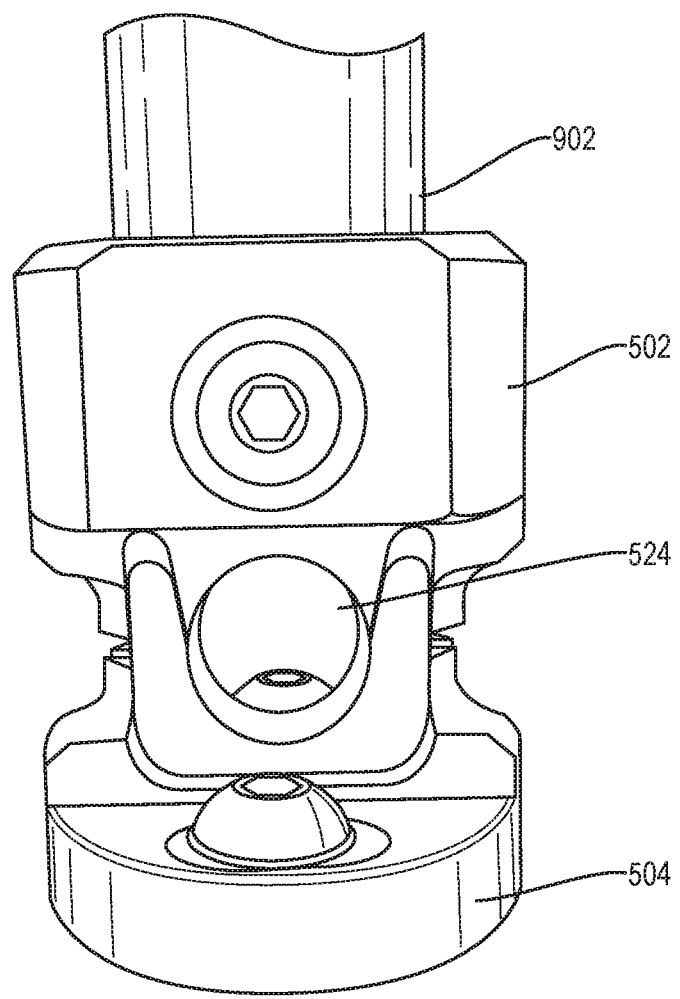
FIG. 9 illustrates the first crimp die and the second crimp die shown in FIGS. 5A and 5B mounted to a press.

FIG. 9 illustrates the crimping die set cooperatively engaged as taught herein. The first crimping die 502 is mounted to a press arm 902. The second crimp die 504 is mounted to a platen. In alternative embodiments, the first crimping die 502 and the second crimp die 504 may be mounted in different configurations, such as the second crimp die 504 mounted to the press arm 902 and the first crimp die 502 mounted to the platen. The press associated with the arm 902 may use hydraulic, mechanical, or pneumatic power to generate a compressive force.

Figure 10:
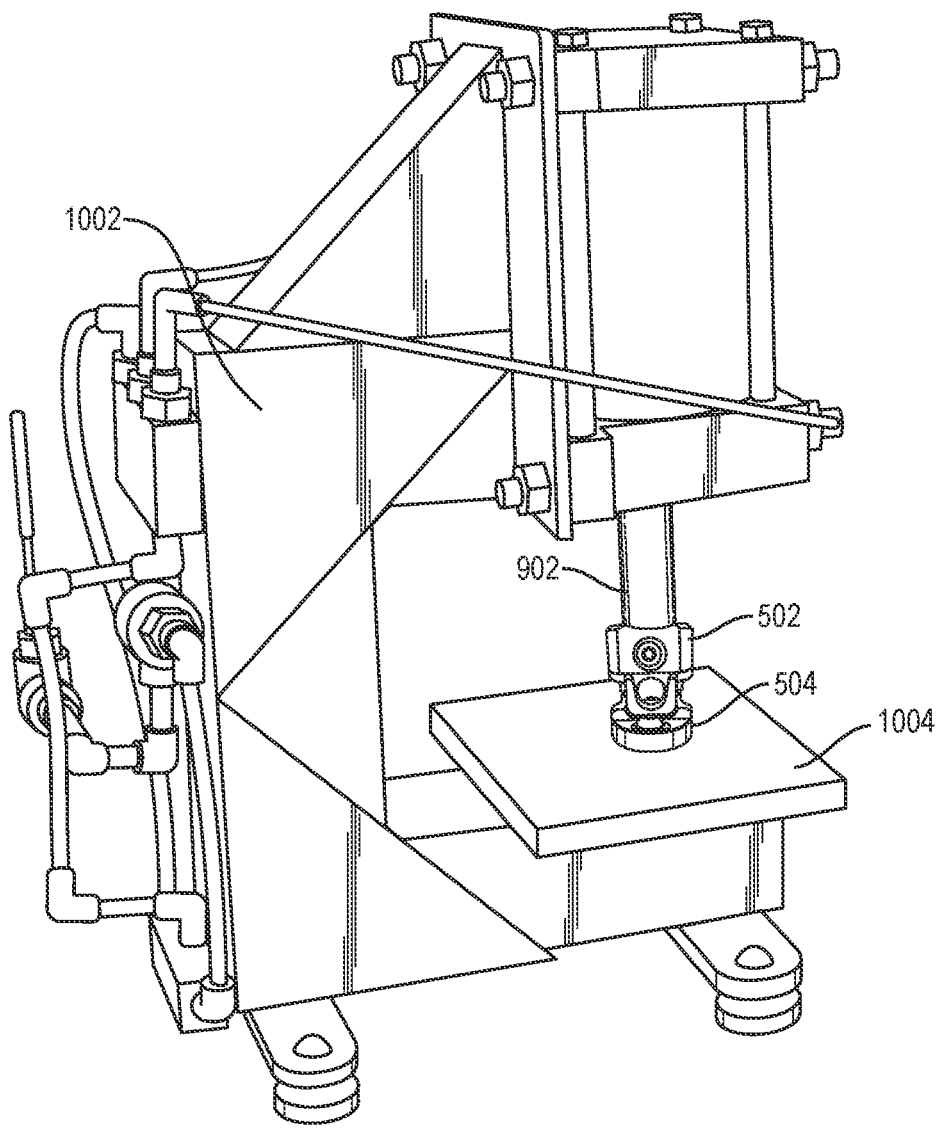
FIG. 10 is an exemplary press apparatus for crimping a metallic crimp ring as taught herein.

FIG. 10 is an exemplary press 1002 for crimping the crimp ring 100 using the first crimp die 502 and the second crimp die 504. The press 1002 includes the press arm 902 and a platen 1004. The press 1002 is actuated to cooperatively engage the first crimp die 502 and the second crimp die 504 to crimp the metallic crimp ring 100.

Figure 11:
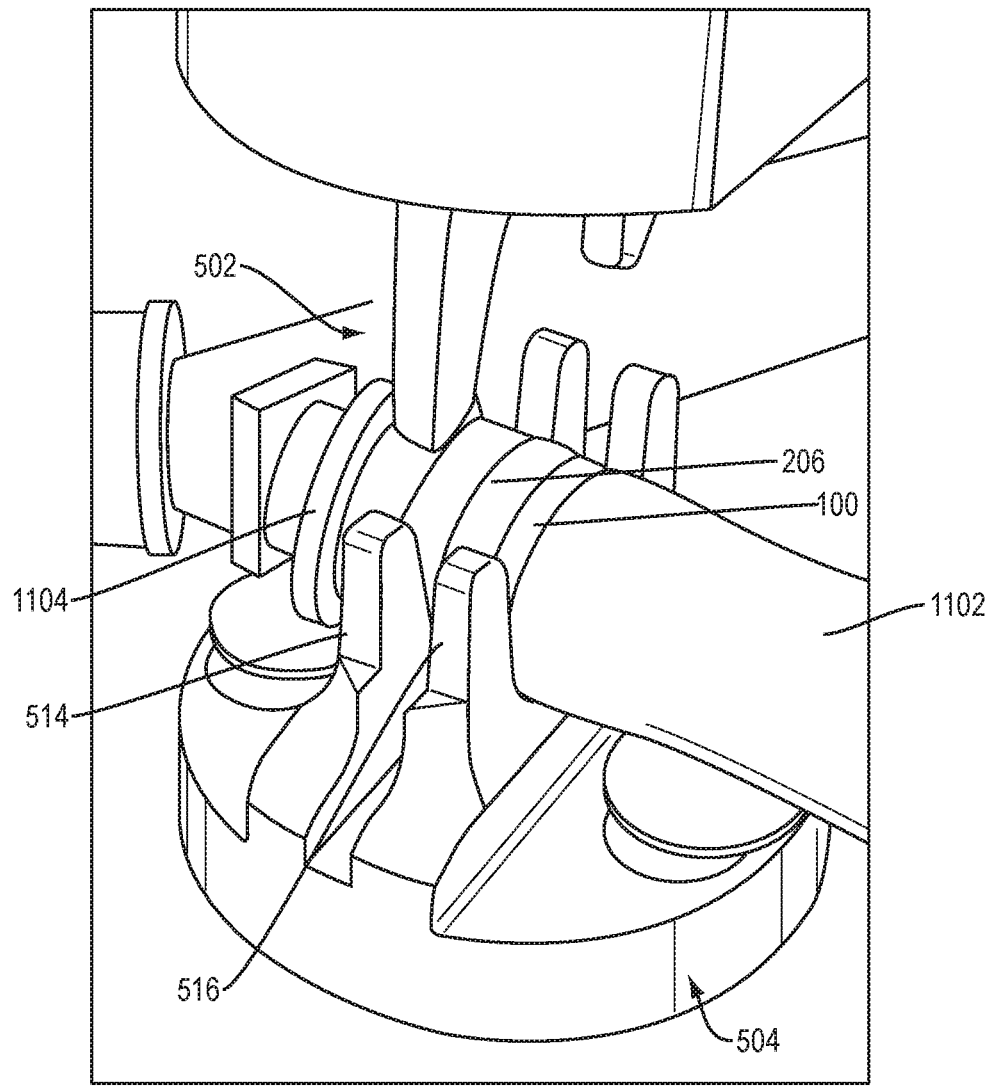
FIG. 11 illustrates a crimp ring within the first crimp die and the second crimp die shown in FIGS. 5A and 5B.
Figure 13F:
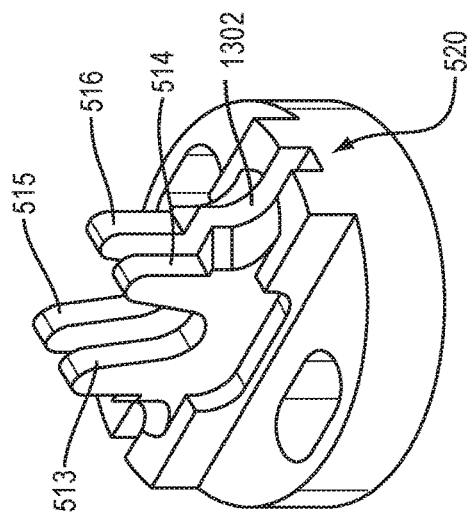
FIGS. 13A-13F illustrates an exemplary mount for the second crimp die as taught herein.
Figure 13E:
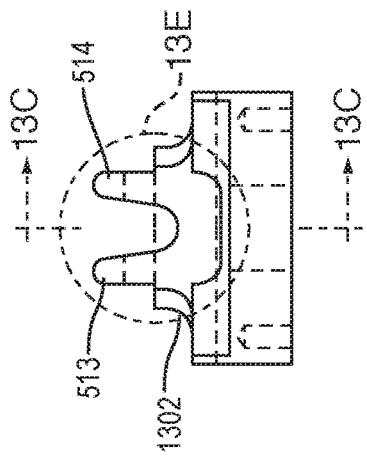
Figure 13B:
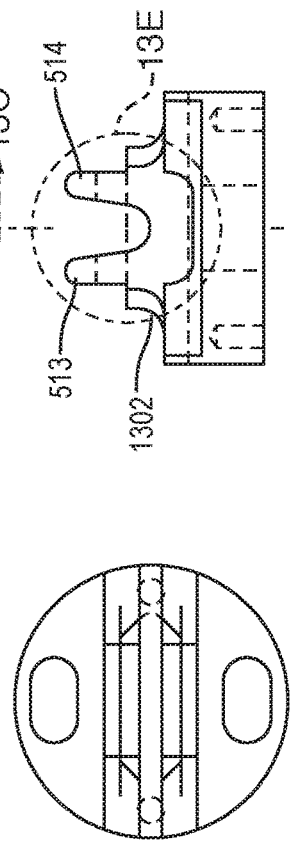
Figure 13D:
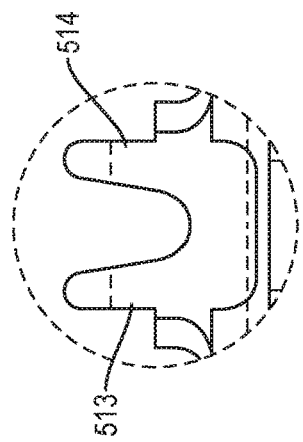
Figure 13A:
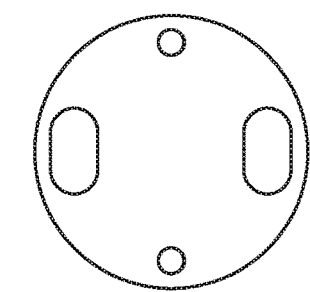
Figure 13C:
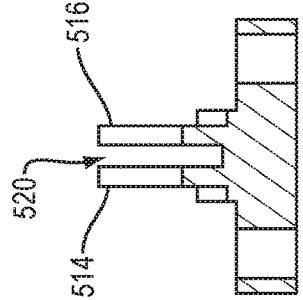

FIG. 11 illustrates the crimp ring 100 seated within the first curved contact surface 519 and the second curved contact surface 521 of the second crimp die 504. As illustrated, the crimp ring 100 is located between the first crimp die 502 and the second crimp die 504. The crimp ring 100 has been crimped by cooperative engagement of the first crimp die 502 and the second crimp die 504 to connect an end portion of a non-metallic flexible tube 1102 to a fitting 1104 to form a mechanical lock and/or a liquid tight seal. The crimped crimp ring 100 includes the annular bead 206 in a center portion of the crimp ring 100.

FIGS. 12A-12F illustrate exemplary views of another embodiment of the first crimp die 502 of crimp die set 500 shown in FIGS. 5A and 5B. The embodiment of the first crimp die shown in FIGS. 12A-F is similar in structure to the embodiment of the first crimp die shown in FIGS. 5A-B, except for the distinctions noted herein. Therefore, like reference numbers are used to refer to like structures. As shown in FIGS. 12A-12F, the first crimp die 502 can include outside relief cuts 1202 formed into the first crimp die 502 to allow for crimping onto a "Y-fitting." This ensures that the crimp die set 500 can be properly engaged for crimping onto a "Y-fitting.

FIGS. 13A-13F illustrate additional exemplary views of the second crimp die 504 of crimp die set 500 shown in FIGS. 5A and 5B. FIGS. 13A-13F include outside relief cuts 1302 into the second crimp die 504 to allow for crimping onto a "Y-fitting." This ensures that the crimp die set 500 can be properly engaged for crimping onto a "Y-fitting.

Figure 14:
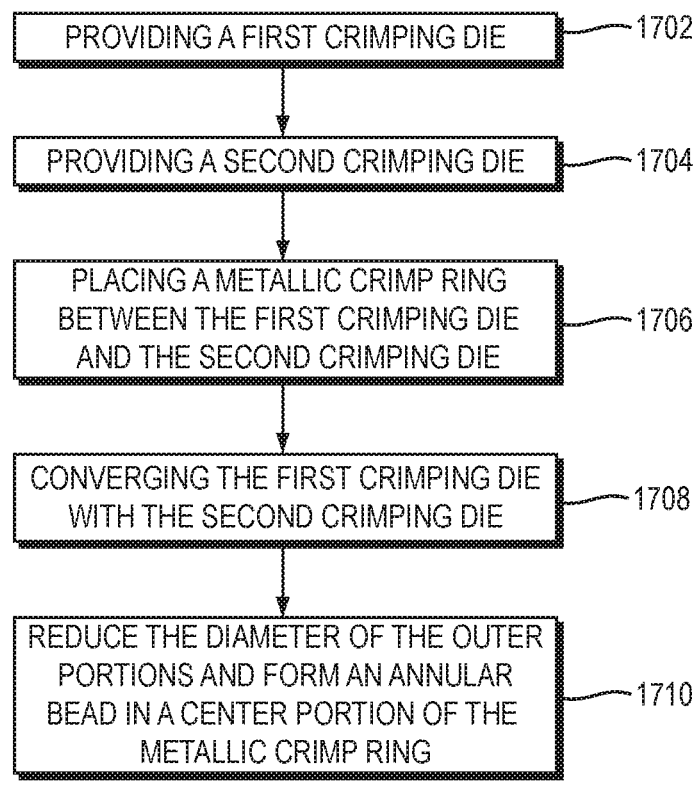
FIG. 14 illustrates an exemplary method for crimping a metallic crimp ring as taught herein.

FIG. 14 illustrates an exemplary method for crimping a metallic crimp ring. The method includes providing in step 1702 the first crimp die 502, 802 having a first curved contact surface and a second curved contact surface. The second curved contact surface is spaced apart from the first curved contact surface as described herein. A radial trench extends between the first curved contact surface and the second curved contact surface.

The method further includes providing in step 1704 a second crimp die 504, 804 cooperatively engageable with the first crimp die 502, 802. The second crimp die 504, 804 includes a first curved contact surface and a second curved contact surface. The second curved contact surface is spaced apart from the first curved contact surface as described herein. A trench extends between the first curved contact surface and the second curved contact surface.

The method also includes placing in step 1706 the metallic crimp ring 100 between the first crimp die 502, 802 and the second crimp die 504, 804. The method further 1708 includes converging the first crimp die 502, 802 with the second crimp die 504, 804. Converging the first crimp die 502, 802 with the second crimp die 504, 804 reduces in step 1710 an inner diameter and an outer diameter of a first outer portion 202 and a second outer portion 204 of the crimp ring 100 by compressing the first outer portion 202 and the second outer portion 204 radially inward. In addition, the radial trench of the first crimp die 502, 802 and the trench of the second crimp die 504, 804 form in step 1710 an annular bead in a center portion of the metallic crimp ring 100.

The description herein is presented to enable any person skilled in the art to create and use the crimping tools and crimping rings described above. Various modifications to the example embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component or step. Likewise, a single element, component or step can be replaced with a plurality of elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

We claim:

1. A crimping tool for crimping a metallic crimp ring, the crimping tool comprising:
   a first crimp die having a first curved contact surface, a second curved contact surface slots adjacent to the first curved contact surface and the second curved contact surface, and a trench extending between the first curved contact surface and the second curved contact surface to define an open space therebetween; and a second crimp die cooperatively engageable with the first crimp die having a first curved contact surface, a second curved contact surface, guide fingers, and a trench extending between the first curved contact surface and the second curved contact surface to define an open space therebetween, wherein the open space of the first crimp die and the open space of the second crimp die are configured to cooperatively provide an uncompressed annular area in between the first and second curved contact surfaces of the first and second crimp die and the guide fingers of the second crimp die are configured to insert within the slots of the first crimp die when the second crimp die is cooperatively engaged with the first crimp die.

2. The crimping tool of claim 1, wherein the first curved contact surface and the second curved contact surface of the first crimp die are spaced at a specific distance for contacting a first outer portion and a second outer portion of the metallic crimp ring.

3. The crimping tool of claim 1, wherein the first curved contact surface and the second curved contact surface of the second crimp die are spaced at a sufficient distance for contacting a first outer portion and a second outer portion of the metallic crimp ring.

4. The crimping tool of claim 1, wherein the curved contact surfaces of the first crimp die and the second crimp die are configured to crimp outer portions of the metallic crimp ring placed between the first crimp die and the second crimp die when the second crimp die is cooperatively engaged with the first crimp die.

5. The crimping tool of claim 1, wherein the first crimp die further includes guide fingers in between the first curved contact surface and the second curved contact surface, the guide fingers configured to insert into the trench of the second crimp die when the second crimp die is cooperatively engaged with the first crimp die.

6. The crimping tool of claim 1, further comprising a press for cooperatively engaging the first crimp die and the second crimp die to crimp the metallic crimp ring.

7. The crimping tool of claim 1, wherein the first crimp die and the second crimp die are operable to attach an end portion of a non-metallic flexible tube to a fitting.

8. The crimping tool of claim 1, wherein the curved contact surfaces of the first crimp die and the second crimp die each form a semi-circle.

9. The crimping tool of claim 1, wherein at least one of the trench of the first crimp die or the trench of the second crimp die is a radial trench.

10. The crimping tool of claim 1, wherein the open space of the first crimp die and the open space of the second crimp die cooperatively form a pressure relief between the first and second curved contact surfaces of the first and second crimp die when cooperatively engaged.

11. The crimping tool of claim 1, wherein the slots define a portion of the first curved contact surface and a portion of the second curved contact surface.

* * * * *